(12) United States Patent
Roitto et al.

(10) Patent No.: US 10,569,279 B2
(45) Date of Patent: Feb. 25, 2020

(54) METHOD OF CONTROLLING A GRINDING MILL PROCESS

(71) Applicant: Outotec (Finland) Oy, Espoo (FI)

(72) Inventors: Ilkka Roitto, Helsinki (FI); Harri Lehto, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 14/769,430

(22) PCT Filed: Feb. 26, 2014

(86) PCT No.: PCT/EP2014/053673
§ 371 (c)(1),
(2) Date: Aug. 20, 2015

(87) PCT Pub. No.: WO2014/131776
PCT Pub. Date: Sep. 4, 2014

(65) Prior Publication Data
US 2015/0375235 A1    Dec. 31, 2015

(30) Foreign Application Priority Data

Feb. 28, 2013    (FI) .................................... 20130070

(51) Int. Cl.
*B02C 25/00*    (2006.01)
*G05B 19/042*    (2006.01)
(Continued)

(52) U.S. Cl.
CPC .............. *B02C 25/00* (2013.01); *B02C 17/00* (2013.01); *B02C 17/002* (2013.01);
(Continued)

(58) Field of Classification Search
CPC ......... B02C 4/42; B02C 25/00; B02C 17/186; B02C 17/002; G05B 19/042; G05B 2219/2627
(Continued)

(56) References Cited

U.S. PATENT DOCUMENTS 3,596,839 A * 8/1971 Putman ................... B02C 25/00
                                                                    241/20
3,887,142 A * 6/1975 McElvain ........... B02C 17/1845
                                                                    241/79
(Continued)

FOREIGN PATENT DOCUMENTS

| EP | 2522430 | 11/2012 | |
|---|---|---|---|
| GB | 1364174 A * | 8/1974 | ............. B24B 49/16 |
| WO | 2007110466 | 10/2007 | |

OTHER PUBLICATIONS

PCT, International Search Report for International Application No. PCT/EP2014/053673, International Filing Date: Feb. 26, 2014 (dated Feb. 27, 2014), pp. 3.
(Continued)

*Primary Examiner* — Faye Francis
(74) *Attorney, Agent, or Firm* — Robert P. Michal, Esq.; Carter, DeLuca & Farrell LLP

(57) ABSTRACT

A grinding circuit comprises a grinding mill having a shaft in a grinding chamber, a cyclone for receiving circuit feed material and for feeding said circuit feed material further in the grinding circuit, and monitoring devices. The grinding mill process comprises pumping circuit feed material from a feed tank to the cyclone upstream of the mill, and pumping the circuit feed material forming slurry into the grinding mill for grinding the slurry into finer particles. The method of controlling the grinding mill process comprises monitoring at least one operational parameter, and controlling particle fineness online by adjusting at least one of the following (Continued)

operational parameters: flow rate of the circuit feed material, density of the circuit feed material, shaft speed, filling rate in the grinding mill, milling density and retention time.

6 Claims, 2 Drawing Sheets

(51) Int. Cl.
 *B02C 23/08* (2006.01)
 *B02C 17/00* (2006.01)
 *B02C 17/18* (2006.01)

(52) U.S. Cl.
 CPC ............ *B02C 17/186* (2013.01); *B02C 23/08* (2013.01); *G05B 19/042* (2013.01); *G05B 2219/2627* (2013.01)

(58) Field of Classification Search
 USPC ...................................... 241/35–36
 See application file for complete search history.

(56) References Cited

U.S. PATENT DOCUMENTS

| | | | | |
|---|---|---|---|---|
| 4,496,106 A | * | 1/1985 | Gross | B02C 17/166 241/171 |
| 4,706,892 A | * | 11/1987 | Klose | B01F 15/00253 241/16 |
| 5,954,276 A | * | 9/1999 | Hintikka | B02C 17/04 241/171 |
| 2005/0001079 A1 | * | 1/2005 | Ford | B02C 17/16 241/18 |
| 2005/0258288 A1 | * | 11/2005 | Dalziel | A61K 9/14 241/172 |

OTHER PUBLICATIONS

PCT, International Preliminary Report on Patentability (Chapter II of the Patent Cooperation Treaty) for International Application No. PCT/EP2014/053673, International Filing Date: Feb. 26, 2014 (dated Feb. 27, 2014), pp. 10.

\* cited by examiner

METHOD OF CONTROLLING A GRINDING MILL PROCESS

CROSS-REFERENCE TO RELATED APPLICATIONS

This is a national stage application filed under 35 USC 371 based on International Application No. PCT/EP2014/053673 filed Feb. 26, 2014 and claims priority under 35 USC 119 of Finnish Patent Application No. 20130070 filed Feb. 28, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method of controlling a grinding mill process.

BACKGROUND OF THE INVENTION

Fine grinding technology use in the mineral processing industry has increased over the last 10 years. This can be mainly attributed to processing finer grained mineral structures, which requires a finer grind for valuable mineral liberation. An ore body requires wide process adaptability and flexibility to cope with the life of mine ore variability.

A grinding process begins typically with a regrinding circuit feed material being pumped to a scalping cyclone upstream of the mill which classifies the target size material off from the feed and defines the milling density. The defined underflow in optimal milling density is pumped into the mill. The slurry enters a grinding chamber containing grinding media (beads) and rotating discs which provide momentum to stir the charge against a series of stationary counter discs. The particles are ground by attrition between the beads. As the flow transfers upwards, the ore slurry passes through the rotating discs and the free space between the static counter discs lining the wall. Depending on the application there may be up to 30 sets of rotating and static discs. Due to the vertical arrangement of the mill, classification is conducted simultaneously throughout the grinding process with larger particles remaining longer at the peripheral, while smaller particles move upwards. The process is typically a single pass with no external classification necessary. Gravity keeps the media compact during operation, ensuring high intensity inter-bead contact and efficient, even energy transfer throughout the volume. Gravity together with an internal hydro classifier prevents the grinding media from escaping the mill by pushing the grinding beads back down into the milling process, and lets through only the fine ground slurry. The disc configuration and the whole chamber geometry have been optimized for efficient energy transfer to the bead mass, internal circulation and classification. With the grinding media evenly distributed, the ore particles remain in constant contact, significantly increasing grinding efficiency. The product discharges at atmosphere at the top of the mill. The combined cyclone overflow and mill discharge are the circuit product.

BRIEF SUMMARY OF THE INVENTION

An object of the present invention is to provide a method for improving control of the grinding mill process. The object of the invention is achieved by a method which is characterized by what is stated in the independent claim. The preferred embodiments of the invention are disclosed in the dependent claims.

The grinding mill process is first described in more detail. In the beginning of the process concentrate starts to flow to scalping cyclone feed sump. The mill comprises a mill body, shaft with grinding discs, shell mounted counter rings, gearbox and drive. The grinding chamber is filled up to 70% with grinding beads. Rotating discs stir the charge and grinding takes place between beads by attrition. Feed slurry is pumped into the mill via bottom connection and when the flow transfers upwards, it passes all consecutive grinding stages. Final product discharges at open atmosphere at the top of the machine. The process comprises only a scalping cyclone, feed tank, pump and the mill.

The method relates to controlling a grinding mill process in a grinding circuit. According to the invention said grinding circuit comprises at least a grinding mill having a shaft in a grinding chamber. The grinding circuit further comprises a cyclone for receiving circuit feed material and for feeding said circuit feed material further in the grinding circuit, and monitoring devices. The grinding mill process comprises at least following steps: pumping circuit feed material from a feed tank to the cyclone upstream of the mill, and pumping the circuit feed material forming slurry into the grinding mill for grinding the slurry into finer particles. The method according to the invention comprises the following steps: monitoring at least one operational parameter, and controlling particle fineness online by adjusting at least one of the following operational parameters: flow rate of the circuit feed material, density of the circuit feed material, shaft speed, filling rate in the grinding mill, milling density and retention time.

According to an embodiment of the invention the method further comprises the steps of calculating the circuit feed material rate, monitoring said feed rate by measuring flow and density of the slurry, determining a specific grinding energy as a set point for the grinding circuit for achieving a suitable particle fineness, controlling the operation of the grinding mill with the shaft speed such that the specific grinding energy set point is reached in spite of changes in the feed rate, and adjusting grinding in the grinding mill based on measurements about particle fineness in grinding circuit by comparing measurements to target values and if fineness differs from target values, a new set point is given for the grinding circuit.

In an embodiment of the invention the method further comprises a step of measuring feed quantity coming from the cyclone and adjusting the mill shaft speed to reach target energy per total feed flow.

In an embodiment of the invention the method further comprises a step of measuring particle size by an online particle analyzer and adjusting the shaft speed to maintain constant product size.

In an embodiment of the invention the method further comprises a step of optimizing product fineness online. The step of optimizing product fineness preferably comprises controlling a power input into the material by a variable speed drive of the grinding mill to control a mill shaft speed.

The grinding mill preferably comprises make-up grinding beads which are fed continuously to the grinding mill along with the slurry.

In an embodiment of the invention the method further comprises a step of increasing or decreasing a bead charge to a new optimal level if there is a change in throughput or in PSD target level.

In an embodiment of the invention the method further comprises a step of measuring a power output of the grinding mill.

Mill speed is controlled to reach set energy consumption per process dry feed. The process feed is calculated from the flow and density measurements in the cyclone feed line. Mill shaft speed is adjusted to reach the target power and net energy. A new set point for energy control based on algorithms is determined from on line particle size indicator (PSI) measurements in mill discharge line and conditioner overflow.

The control principle is to measure scalping cyclone feed quantity and adjust the mill shaft speed to reach target energy per total feed flow. Another alternative control principle is that particle size is measured by online particle analyzer and the mill shaft speed is adjusted to maintain constant product size.

The flow from upstream processes can vary remarkably due to fluctuations in ore grade and quality. Also the target fineness can vary because of variations in the ore mineralogy. High Intensity Grinding mill offers a unique opportunity to optimize product fineness on-line through the use of higher level expert system, like Outotec ACT (Advanced Control Tools). This is due to the High Intensity Grinding mill having a variable speed drive to control the mill shaft speed, which in turn controls the power input into the material. The material being the feed going into the mill, i.e. the circuit feed material. A set point for the specific grinding energy (SGE) is determined to achieve the product fineness. The ACT expert control system uses feed forward and feedback control principles. The feed forward control principle is used by measuring scalping cyclone feed quantity which is measured by flow and density meters and adjusts the mill shaft speed to reach target energy per total feed flow. This principle ensures the target SGE is reached at all times even the throughput varies. The feedback control principle is used by measuring the particle size distribution with an on-line analyzer and adjusts the mill shaft speed to maintain a constant product size. The make-up grinding beads are fed continuously to the mill along with the slurry feed. If there is a permanent large scale change in feed rate, grind ability or in target product particle size distribution (PSD). The bead charge is increased or decreased to the new optimal level to ensure that the online control with shaft speed can be fully utilized.

A wide range of grinding applications can be addressed as the grinding mill has an excellent flexibility to adapt to fluctuating process conditions. Typical applications for the grinding mill is the regrinding of concentrates (e.g. magnetic, flotation), iron ore tertiary grinding, precious metal ores, and fine grinding for hydrometallurgical processes. Both ceramic and steel beads can be used. Ceramic media is typically used for sulphide concentrate regrinding to prevent iron contamination on the sulphide mineral surface, which would otherwise result in poorer flotation recovery and grade. The grinding mill can use a wide range of grinding media diameter which depends on the application: 0.5-1.5 mm in ultra-fine, 1-3 mm in fine grinding and 3-6 mm in coarse grinding, where the grinding size is defined for coarse range, F80 100-300 µm, P80 50-100 µm, for fine range, F80 50-100 µm, P80 20-60 µm and for ultra-fine range F80 <70 µm, P80 <20 µm.

Typical process parameters for industrial operations are: Feed solids 30% by volume (i.e. 50% by weight if solids density 2.7), about 60% of the mill volume is filled with beads, typical bead material is ceramics (i.e. zirconia-alumina-silicate, density 3.8-4.2 kg/dm$^3$), steel and high density (<6 kg/dm$^3$) ceramics are options, bead size 0.5-6 mm depending to the F80 and P80, shaft speed 4-8 m/s in smaller units, 8-12 m/s in larger units, typical retention time 1-3 minutes, specific grinding energies from 5 up to 100 kWh/t, and power intensity, kW/m$^3$, is high 100-300 kW/m$^3$.

A special feature of the High Intensity Grinding mill is that energy efficiency remains constant through a wide variety of operational parameter combinations; flow rates, shaft speeds, and media filling rates. Within each flow rate, each SGE point is generated by varying the mill shaft speed. Power draw increases exponentially if the shaft speed is increased. If the shaft speed is doubled the power draw is tripled. This makes it possible to control PSD on-line and dampen flow rate and quality fluctuations. The PSD set point can be changed on line by changing shaft speed. The same energy efficiency is achieved with different grinding media filling volumes. This makes it possible to control the PSD on-line and to account for filling volumes or bead wear. The power input and PSD can be changed on line by changing shaft speed. There is almost a linear correlation between media filling rate and power draw. Thus, media charge increase is directly related to power draw increase. The power draw is directly related to Specific Grinding Energy (SGE) (kWh/t). If there is a 10% v/v decrease in media charge from 70% v/v to 60% v/v, the result is a ~20% decrease in SGE. Therefore to obtain the same SGE and grind size; the feed rate must also decrease by ~20%.

An advantage of the method of the invention is that the process can handle the upstream process fluctuations. Grinding process has an effective control strategy for controlling the product fineness.

BRIEF DESCRIPTION OF SEVERAL VIEWS OF THE DRAWINGS

In the following, the invention is described in more detail by means of preferred embodiments with reference to the attached drawings, in which.

DETAILED DESCRIPTION OF THE INVENTION

Figure 1:
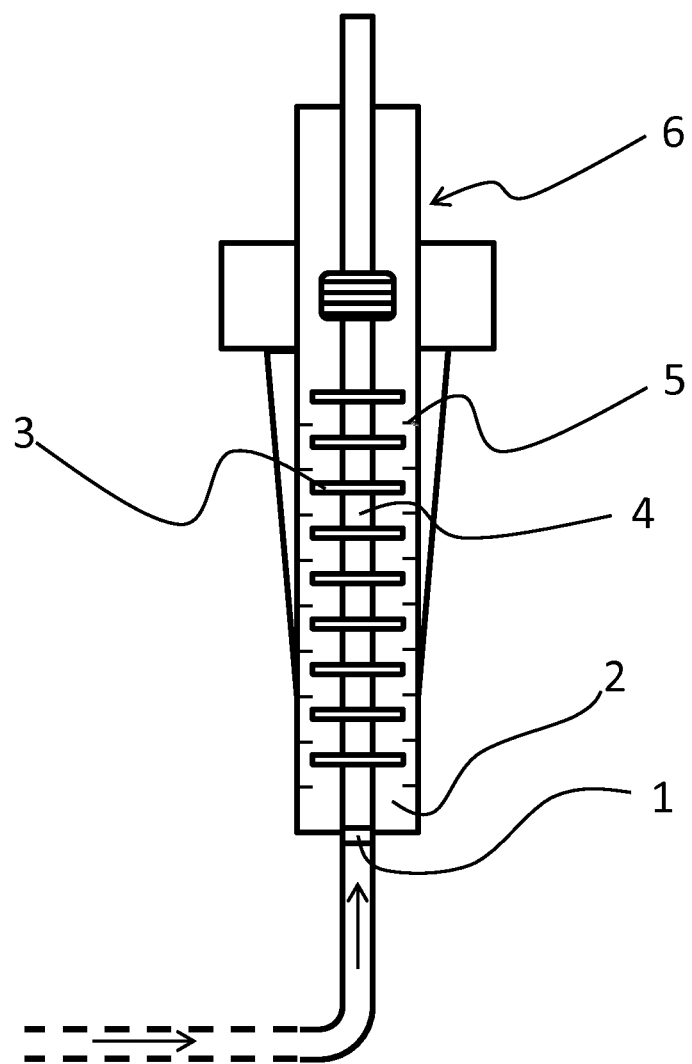
FIG. 1 illustrates a High Intensity Grinding mill containing main components.

FIG. 1 illustrates the High Intensity Grinding mill with the main components. The grinding process feed is typically concentrate slurry, which is fed to the mill together with grinding beads. The slurry enters a grinding chamber via the feed inlet 1 from the bottom of the grinding chamber 2. The combination of slurry concentrate, grinding media (beads) and rotating discs 3, coupled with mill shaft 4 provides momentum to stir the charge against a series of stationary counter discs 5. During constant and continuous operation the slurry flow transfers upwards, the ore slurry passes through the rotating discs 3 and the free space between the static counter discs 5. The product discharges at atmosphere at the top of the mill 6.

Figure 2:
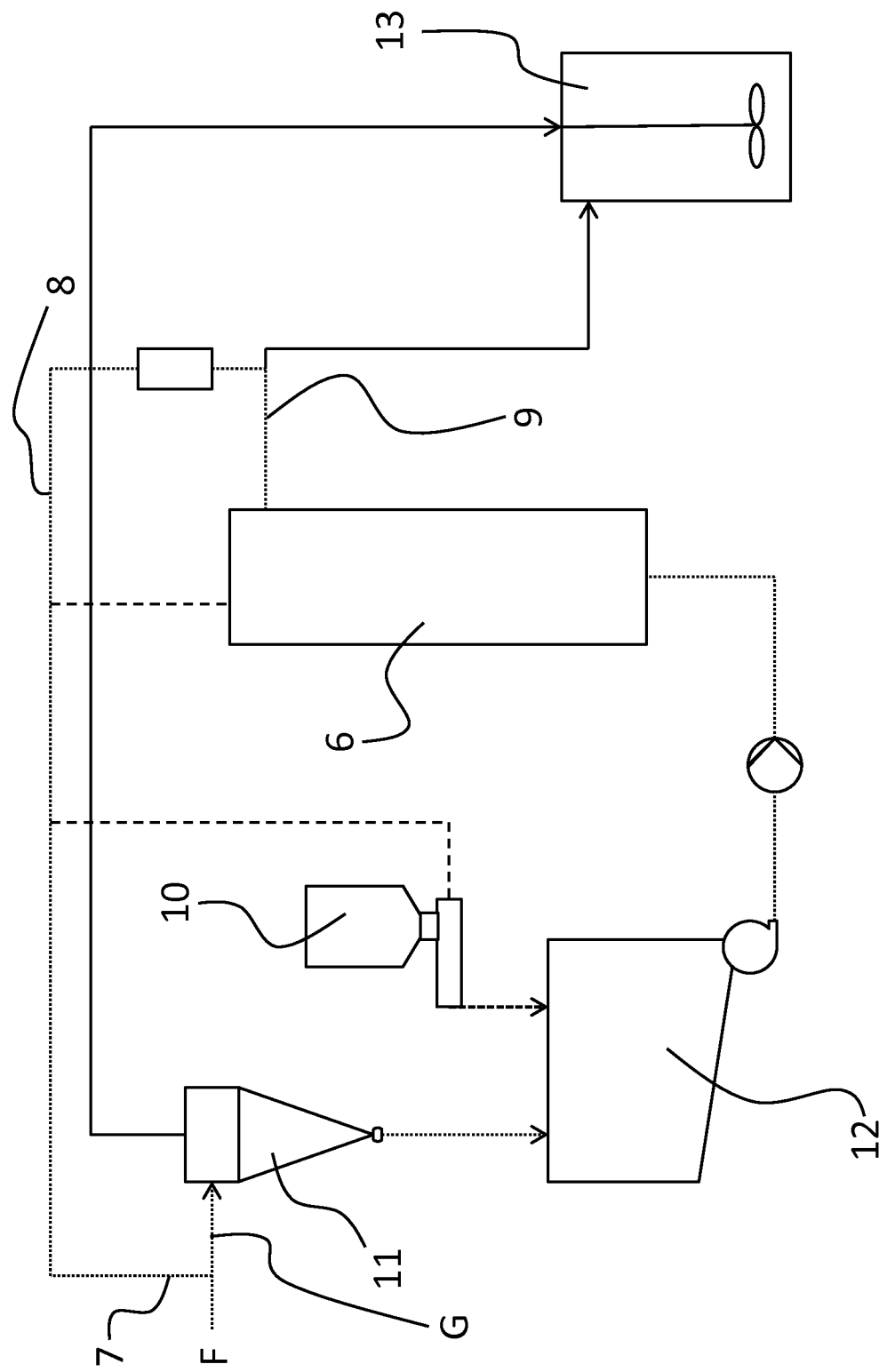
FIG. 2 illustrates a schematical presentation of the grinding mill flow sheet.

FIG. 2 illustrates a schematical flow sheet of the grinding process. The feed forward control principle is applied by measuring grinding circuit feed material F quantity by flow and density meters 7 and adjusting the mill shaft speed to reach target SGE per total feed flow. This principle ensures the target SGE is reached at all times even in the fluctuating feed rate conditions. The grinding circuit G is shown with a dashed line. The grinding circuit G comprises at least a grinding mill 6 having a mill shaft 4 in a grinding chamber 2 said grinding circuit G further comprises a cyclone 11 for receiving circuit feed material and for feeding said circuit feed material further in the grinding circuit G, and monitoring devices.

The grinding mill process comprises at least the steps of pumping circuit feed material from a feed tank to the cyclone 11 upstream of the mill, pumping the circuit feed material forming slurry into the grinding mill 6 for grinding the slurry into finer particles, monitoring at least one operational parameter, and controlling particle fineness online by adjusting at least one of the following operational parameters: flow rate of the circuit feed material, density of the circuit feed material, shaft 4 speed, filling rate in the grinding mill 6, milling density and retention time. Adjusting is based on the monitoring and the monitoring is operated online.

On-line particle size measurement 8 is used to control the particle size of the product flow 9 to downstream process. If the product size is out of the target; coarser or finer, upper level control (ACT) gives a new set point to the SGE.

The make-up grinding beads are fed to the mill with the slurry feed via a grinding beads hopper 10. If there is a permanent large scale change in feed rate, grind ability or in PSD, the bead charge is increased or decreased to the new optimal level to ensure that the online control with shaft speed can be fully utilized.

In the grinding mill process the method for controlling the process comprises at least following steps: pumping grinding circuit feed material F from a feed tank to a cyclone 11 upstream of the mill, and pumping the slurry into the grinding mill 6 for grinding the slurry into finer particles. Before the feed F enters the grinding mill 6 it preferably goes through a pump sump 12 in which water is added to the process. Between the pump sump 12 and the grinding mill 6 pressure is monitored. The grinding mill 6 grinds the slurry into finer particles and is then fed to the flotation 13.

It will be obvious to a person skilled in the art that, as the technology advances, the inventive concept can be implemented in various ways. The invention and its embodiments are not limited to the examples described above but may vary within the scope of the claims.

The invention claimed is:

1. A method of controlling a grinding mill process in a grinding circuit, wherein said grinding circuit comprises:
   a feed tank;
   a grinding mill having a mill shaft in a grinding chamber;
   a cyclone for receiving feed material and for feeding the feed material further in the grinding circuit;
   a pump; and
   feed material monitoring devices, wherein the method of controlling the grinding mill process in a grinding circuit further comprises the steps of:
      pumping feed material from the feed tank to the cyclone upstream of the grinding mill; and
      adding water to the feed material to form a feed slurry and pumping the feed slurry into the grinding mill for grinding the feed slurry into finer particles;
      measuring particle size distribution of the feed material coming from the cyclone in the grinding circuit using at least one of the feed material monitoring devices;
      comparing specific grinding energy measurements measured by at least one of the feed material monitoring devices to a target specific grinding energy per total feed material flow value; and
      controlling mill shaft speed of the mill shaft provided in the grinding chamber of the grinding mill to reach the target specific grinding energy per total feed material flow.

2. The method according to claim 1, wherein the method further comprises the following steps:
   monitoring a feed material rate by measuring flow and density of the slurry using the feed material monitoring devices;
   determining a specific grinding energy as a set point for the grinding circuit for achieving a target particle size;
   controlling the operation of the grinding mill with the mill shaft speed such that the specific grinding energy set point is reached in spite of changes in the feed material rate; and
   adjusting grinding in the grinding mill based on measurements by the feed material monitoring devices about particle size in the grinding circuit by comparing measurements by the feed material monitoring devices to target values and if the particle size differs from target values, a new set point is given for the grinding circuit.

3. The method according to claim 1, wherein the method further comprises a step of controlling particle size by controlling a power input into the feed material by a variable speed drive of the grinding mill to control the mill shaft speed.

4. The method according to claim 1, wherein the grinding mill comprises make-up grinding beads which are fed continuously to the grinding mill along with the slurry.

5. The method according to claim 1, wherein the method further comprises a step of increasing or decreasing a bead charge to a new optimal level if there is a change in throughput or in a particle size distribution target level.

6. The method according to claim 1, wherein the method further comprises a step of measuring a power output of the grinding mill.

* * * * *